United States Patent [19]

Gallo et al.

[11] 4,274,501

[45] Jun. 23, 1981

[54] MASS AND FORCE METER

[75] Inventors: Mario Gallo; Johannes Wirth, both of Zurich, Switzerland

[73] Assignee: Wirth, Gallo & Co., Zurich, Switzerland

[21] Appl. No.: 98,028

[22] Filed: Nov. 28, 1979

[30] Foreign Application Priority Data

Sep. 19, 1979 [EP] European Pat. Off. ......... 792005258

[51] Int. Cl.³ ............................................. G01G 3/16
[52] U.S. Cl. ............................ 177/210 FP; 73/862.61; 177/225
[58] Field of Search ............ 177/210 FP, 210 R, 211, 177/225; 338/6; 73/141 R, 141 A, DIG. 1

[56] References Cited

U.S. PATENT DOCUMENTS

| 1,759,886 | 5/1930 | Bousfield . | |
| 2,899,191 | 8/1959 | Hunt | 177/211 |
| 3,366,189 | 1/1968 | Bellier | 177/211 X |
| 3,692,128 | 9/1972 | Gallo | 177/210 FP |
| 3,831,687 | 8/1974 | Maffia | 177/210 |
| 3,938,603 | 2/1976 | Shoberg | 177/211 |

FOREIGN PATENT DOCUMENTS 188987 9/1907 Fed. Rep. of Germany .
2531672 10/1976 Fed. Rep. of Germany .

Primary Examiner—Joseph W. Hartary
Attorney, Agent, or Firm—Stevens, Davis, Miller & Mosher

[57] ABSTRACT

Mass and force meter with a frame, a load support and a rigid measuring system, in which only a part of the weight of the mass to be measured or of the force to be measured is transmitted to the measuring system, an intermediate body mounted between the load support and the frame which comprises two rigid parts linked by at least one resilient part, the load support being connected to the intermediate body by means of a number of load connections, the intermediate body being supported by the frame by means of an equal number of supporting connections, said rigid parts carrying each a spring lying outside the plane of said flexible part, the ends of these springs being linked to the measuring system.

6 Claims, 13 Drawing Figures

MASS AND FORCE METER

The invention relates to a mass and force meter with a frame, a load support and a rigid measuring system, in which only a part of the weight of the mass to be measured or of the force to be measured is transmitted to said measuring system.

Meters of this type are known. European Patent Appln. No. 78 101 647 describes a meter with a frame, a load support connected to said frame, a measuring system with two dynamometers, a reference base and a force input, a load spring mounted between said frame and said load support, a measuring spring mounted between said load support and said force input, said measuring spring being weaker than said load spring. The springs replace at least partly the force reducing lever systems in mass meters. They can also be used for linearizing the characteristic of the meter in cases where it is non-linear.

European patent Appln. No. 79.100.900.4 describes a mass and force meter with a frame, a load support, means for its parallel and vertical guidance, a rigid measuring system and a transmission element transmitting a part of the weight of the mass or of the force to be measured to the measuring system. The means for parallel and vertical guidance of the load support comprise at least two flat springs mounted in two at least substantially parallel planes lying one above the other, the ends of the flat springs being sunk in the frame and in the load support. The transmission element is made from a resilient material. This construction is particularly suitable where large loads must be reduced without high construction cost.

The first meter mentioned has the drawback that the load support and the elastical force reduction means must consist of separate constructive elements. Whilst this drawback is eliminated in the second meter mentioned by combining the means for guiding the load support and the reduction means, it requires generally a certain height. In many applications it is, however, mandatory to achieve a very low height of the meter.

It is an object of the invention to provide a meter in which large loads can be reduced without force reducing lever systems, whereby still a low total height can be achieved. Furthermore, no complications due to the guidance of the diverse elements should arise.

According to the invention this can be achieved in that between said load support and said frame an intermediate body is mounted which comprises two rigid parts linked by at least one resilient part, that said load support is connected to said intermediate body by means of a number of load connections, said intermediate body being supported by said frame by means of an equal number of supporting connections, said rigid parts carrying each a spring lying outside the plane of said flexible part, the ends of said springs being linked to said measuring system.

In the enclosed drawings embodiments of the invention are represented schematically.

Figure 1:
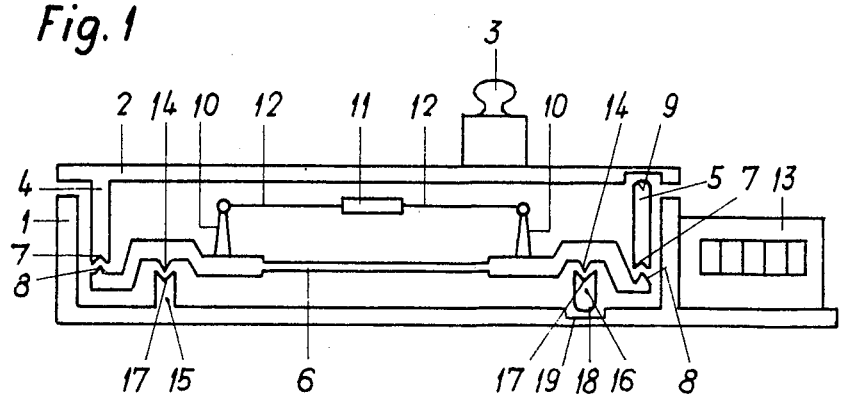
FIG. 1 is an elevation of a first embodiment.

The mass meter shown schematically in FIG. 1 has a frame 1 and a load support 2 for a mass 3 to be measured. Load support 2 is supported by an intermediate body 6 on one side by means of an arm 4 and on the other side by means of a rod 5. Sockets 7 are fixed to the lower ends of arm 4 and of rod 5 which work together with load knives 8 of intermediate body 6. The upper surface 9 of rod 5 is rounded off and the lower surface of load support 2 lies on it. As explained in more detail further below, two springs 10 are fixed to intermediate body 6. A rigid measuring system 11 is held by two wires 12 fixed to the free ends of springs 10. This measuring system 6 can consist, for instance, of a force measuring cell with two vibrating strings as well known in the art. Measuring system 6 is connected in well known manner with a computing and display device 13 which displays the mass of load 3 to be measured. Intermediate body 6 has two supporting knives 14 supported on one side by an arm 15 of frame 1 and on the other side by a rod 16. The upper ends of arm 15 and rod 16 bear sockets 17 for receiving supporting knives 14. The lower end of rod 16 presents a rounded off surface 18 applied to a surface 19 of frame 1.

Figure 2:
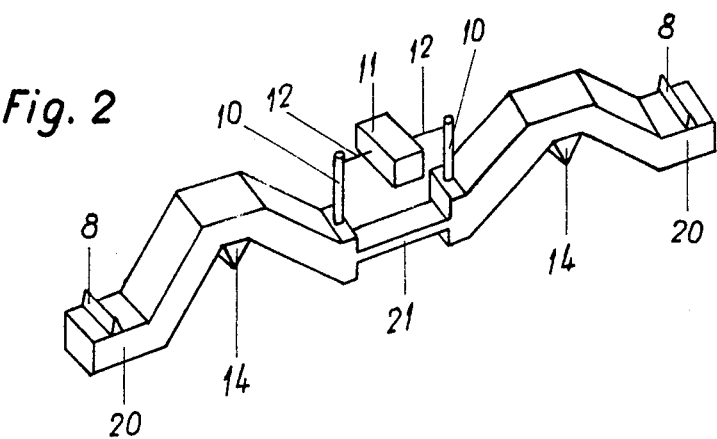
FIG. 2 shows in perspective the intermediate body of FIG. 1.
Figure 3:
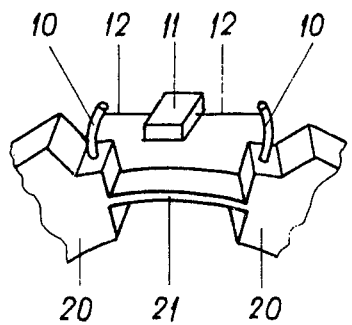
FIG. 3 shows a partial view of this intermediate body when loaded.

Intermediate body 6 is represented in perspective in FIG. 2. It is I-shaped and comprises two rigid parts 20 and an resilient part 21. Springs 10, which in this embodiment consist of elastical rods, are fixed to rigid parts 20. When load 3 is centred on load support 2, part 21 is flexed and takes the form of an arc of circle (FIG. 3). If load 3 is not centred, part 21 takes the form of an arc of parabole. In both cases the amount of flexion of part 21 is proportional to load 3 and independent of its position. When part 21 is flexed the distance of the lower ends of springs 10 on parts 20 from each other remains practically unchanged. The upper ends of these springs 10, were they free, would normally move away from each other. As they are fixed to wires 12, springs 10 must bend toward each other. They exert on measuring system 11 a force proportional to load 3 and independent of its position. In FIG. 3 the bending of springs 10 is strongly exaggerated for the sake of a better understanding. In practice the ends of springs 10, were they free, would move by at most 0.1 mm to 1 mm. As they are linked to measuring system 11 by means of wires 12, these ends move at most by 0.01 mm to 0.1 mm. The two pairs of knives comprising each a load knife 8 and a supporting knife 14 are mounted symmetrically with respect to measuring system 11. In the embodiment of FIG. 1 parts 20 have such a form that all four knives 8, 14 lie in the same horizontal plane. This arrangement is advantageous, it is not at all mandatory for implementing the invention.

The meter described is statically fully determined. The forces exerted on knives 8, 14 by frame 1 and load support 2 are univocally defined by the magnitude and the position of load 3.

Figure 4:
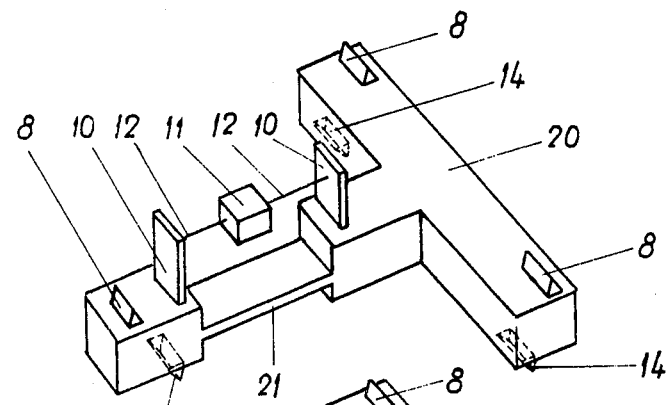
FIGS. 4–9 show each in perspective a variant of the intermediate body.

In FIG. 4 an intermediate body is represented the springs 10 of which are formed by flat springs. It has three pairs of knives. The right hand part 20 bears two pairs of knives 8, 14 and the left hand part 20 only one such pair. All load knives 8 lie in the same horizontal plane and all supporting knives 14 lie in another plane parallel to the first one. All pairs of knives are mounted symmetrically with respect to measuring system 11.

This arrangement is maintained in the embodiment of FIG. 6 to 9.

Figure 5:
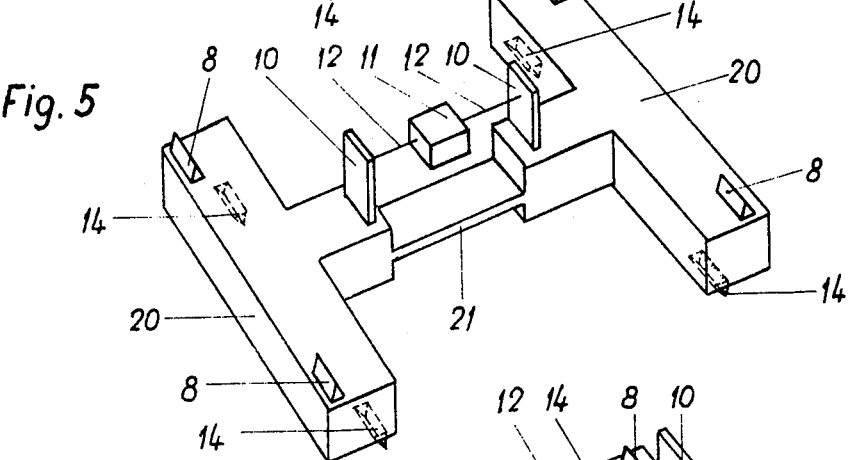

In the embodiment illustrated in FIG. 5, the two rigid parts 20 form an H-shaped intermediate body. Other elements of FIG. 5 are as described with respect to FIG. 4.

Figure 6:
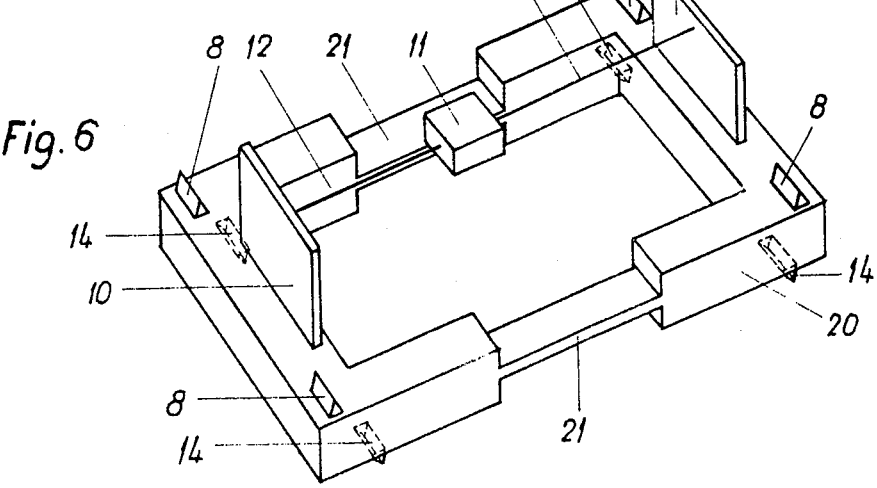
Figure 7:
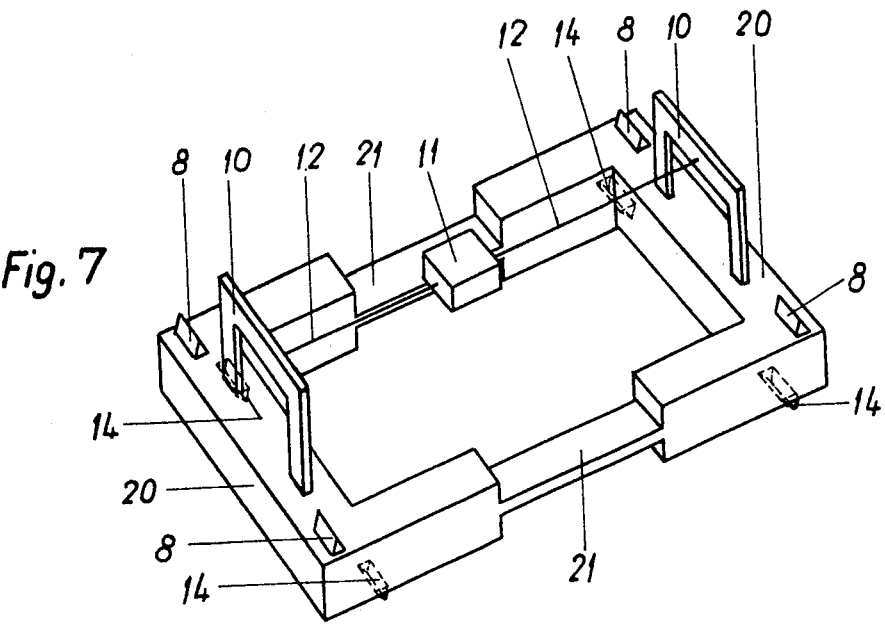
Figure 8:
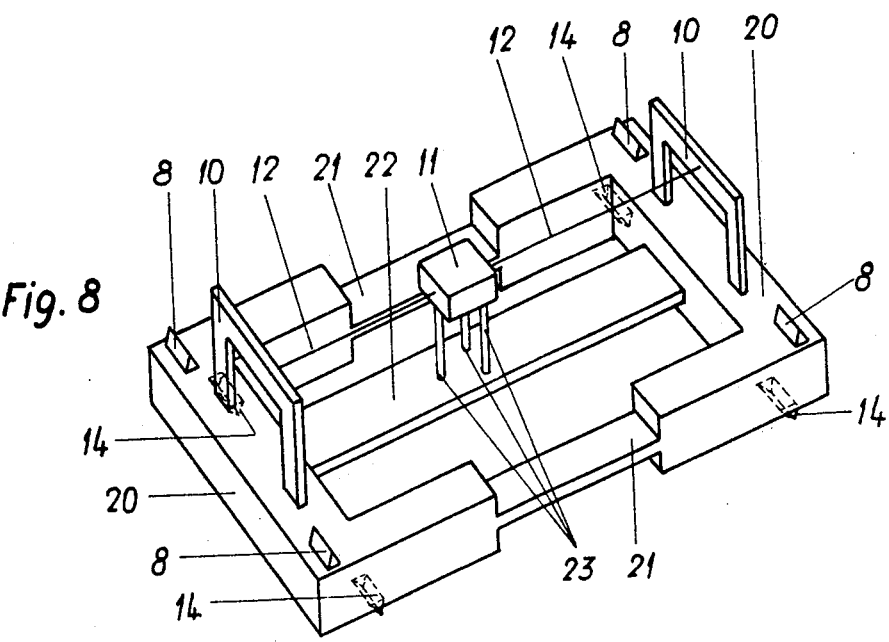
Figure 9:
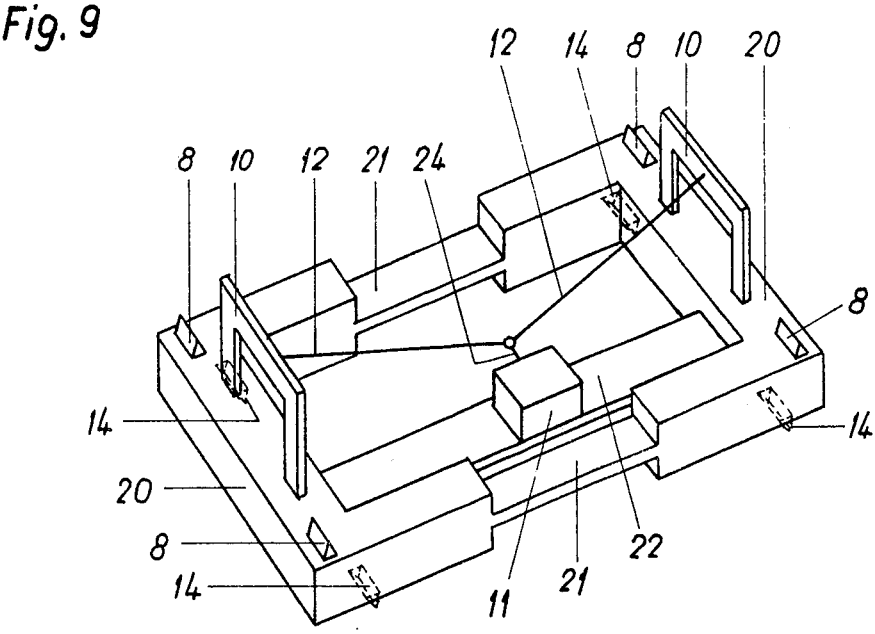

In the embodiment of FIGS. 6–9 intermediate body 6 comprises two rigid C-shaped parts 20 and two resilient parts 21. Parts 20 have each two pairs of knives 8 and 14. In the embodiment of FIG. 6 springs 10 consist of flat springs. In the embodiment of FIGS. 7–9 springs 10 consist of flat, C-shaped springs which when loaded are flexed as well as rolled. In the embodiment of FIG. 8 a thin support 22 is mounted between parts 20. Its resiliency is a multiple of that of parts 21 so that its contribution when intermediate body 6 is under load can be neglected. Supporting elements 23 are mounted between measuring system 11 and support 22. In the embodiment of FIG. 9 support 22 is mounted asymmetrically and measuring system 11 is fixed to support 22. Wire 12 forms then with an additional wire 24 a wire system allowing to multiply or to reduce the force exerted by springs 10 when loaded.

Figure 10:
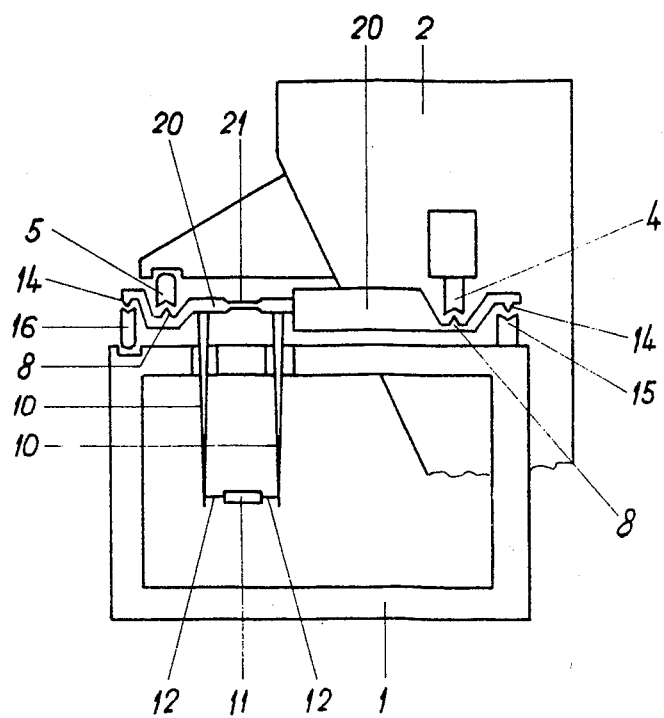
FIG. 10 shows a second embodiment.
Figure 11:
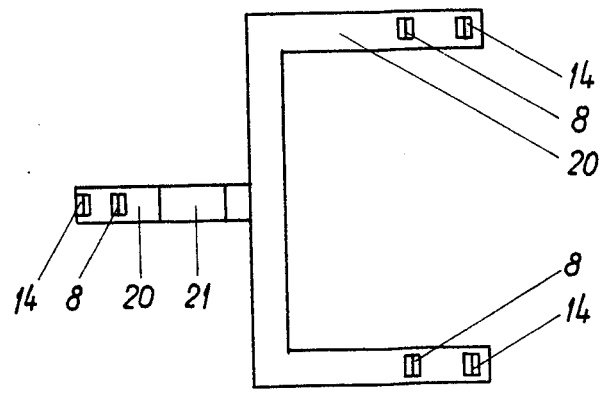
FIG. 11 shows the intermediate body of FIG. 10.
Figure 13:
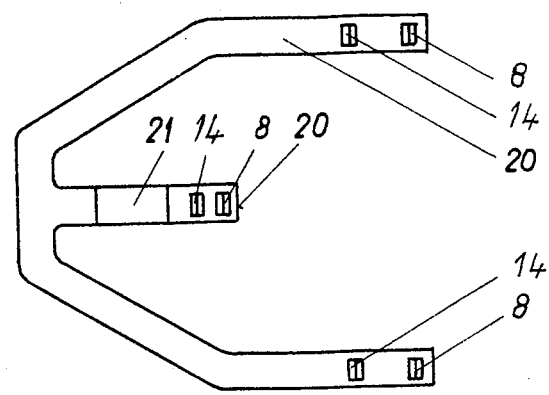
FIG. 13 shows the intermediate body of FIG. 12.
Figure 12:
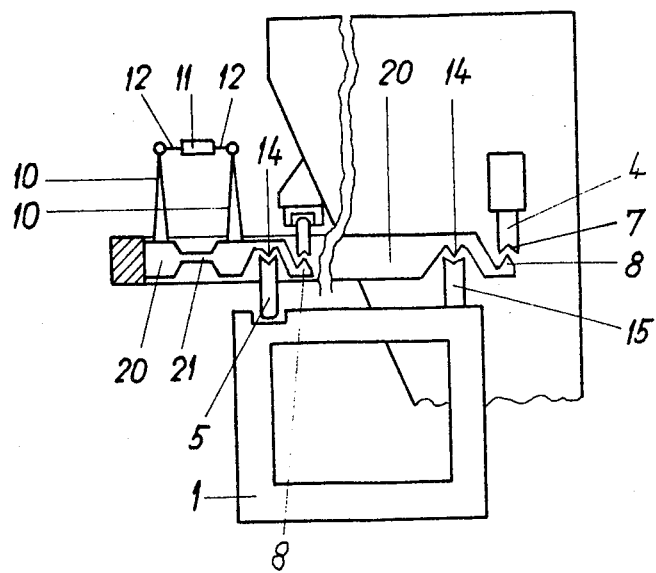
FIG. 12 shows a third embodiment.

In FIGS. 10–11 a variant of the embodiment of FIG. 1 is represented, which is suitable for load supports in form of a container. One of parts 20 is C-shaped and the other is straight. The C-shaped part 20 has two pairs of knives 8, 14 the other part 20 only one. In this embodiment the two knives 8, 14 of the left hand part 20 are mounted closer to each other than the knives 8, 14 of the two pairs of knives of the right hand part 20. Part 21 lies nearer from this pair of knives of the left hand part 20 than from the pairs of knives of the right hand part 20. FIGS. 12–13 show a further variant in which part 21 lies outside the triangle formed by the three pairs of knives.

In the above description the load and support connections are formed by knives and sockets. They could as well be formed by cross articulations or tape articulations. Flexible parts 21 are to be dimensioned according to the application considered. Meters of the type described can be used for load ranges within 30 kg to 3 t.

We claim

1. In a mass and force meter a frame, a load support, a measuring system receiving only a part of the weight of the mass to be measured or of the force to be measured, an intermediate body mounted between said frame and said load support comprising two rigid parts linked by at least one resilient part, a number of load connections on said rigid parts by means of which said load support is supported by said intermediate body, an equal number of supporting connections on said rigid parts by means of which said intermediate body is supported by said frame, a spring mounted on each of said rigid parts, said springs being outside the plane of said resilient part and having free ends connected to said measuring system.

2. In a mass and force meter a frame, a load support, a measuring system receiving only a part of the weight of the mas to be measured or of the force to be measured, an I-shaped intermediate body mounted between said frame and said load support comprising two rigid parts linked by a resilient part, two load knives on said rigid parts by means of which said load support is supported by said intermediate body, two supporting knives on said rigid parts by means of which said intermediate body is supported by said frame, a spring mounted on each of said rigid parts, said springs being outside the plane of said resilient part and having free ends connected to said measuring system.

3. In a mass and force meter a frame, a load support, a measuring system receiving only a part of the weight of the mass to be measured or of the force to be measured, a T-shaped intermediate body mounted between said frame and said load support comprising two rigid parts linked by a resilient part, two load knives on one of said rigid parts and one load knife on the other by means of which said load support is supported by said intermediate body, two supporting knives on one of said rigid parts and one supporting knife on the other by means of which said intermediate body is supported by said frame, a flat spring mounted on each of said rigid parts, said flat springs being outside the plane of said resilient part and having free ends connected to said measuring system.

4. In a mass and force meter a frame, a load support, a measuring system receiving only a part of the weight of the mass to be measured or of the force to be measured, an H-shaped intermediate body mounted between said frame and said load support comprising two rigid parts linked by a resilient part, each of said rigid parts having two load knives by means of which said load support is supported by said intermediate body and two supporting knives by means of which said intermediate body is supported by said frame, a flat spring mounted on each of said rigid parts, said flat springs being outside the plane of said resilient part and having free ends connected to said measuring system.

5. In a mass and force meter a frame, a load support, a measuring system receiving only a part of the weight of the mass to be measured or of the force to be measured, an intermediate body mounted between said frame and said load support comprising two C-shaped rigid parts linked by two straight resilient parts, each of said rigid parts having two load knives by means of which said load support is supported by said intermediate body and two supporting knives by means of which said intermediate body is supported by said frame, a C-shaped flat spring mounted on each of said rigid parts, said C-shaped flat springs being outside the plane of said resilient part and having free ends connected to said measuring system.

6. In a mass and force meter a frame, a load support, a measuring system receiving only a part of the weight of the mass to be measured or of the force to be measured, an intermediate body mounted between said frame and said load support comprising two C-shaped rigid parts linked by two straight resilient parts, each of said rigid parts having two load knives by means of which said load support is supported by said intermediate body and two supporting knives by means of which said intermediate body is supported by said frame, a C-shaped flat spring mounted on each of said rigid parts, said C-shaped flat springs being outside the plane of said resilient part and having free ends connected to said measuring system, a support mounted between said rigid parts supporting said measuring system.

* * * * *